March 16, 1948.  T. W. CARRAWAY  2,437,936
AIR CONDITIONING APPARATUS
Filed Nov. 30, 1944   5 Sheets-Sheet 1

Inventor
Thomas W. Carraway
By Baldwin & Wight
Attorneys

March 16, 1948. T. W. CARRAWAY 2,437,936
AIR CONDITIONING APPARATUS
Filed Nov. 30, 1944 5 Sheets—Sheet 2
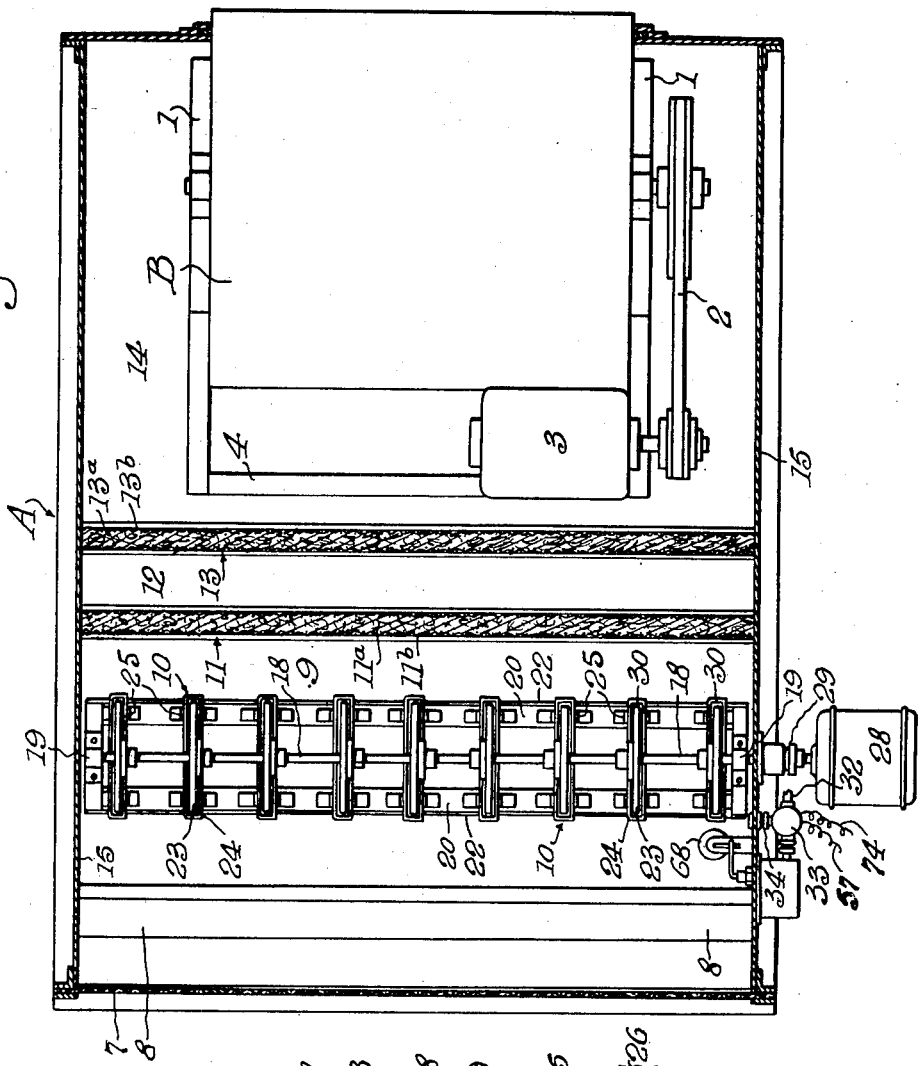
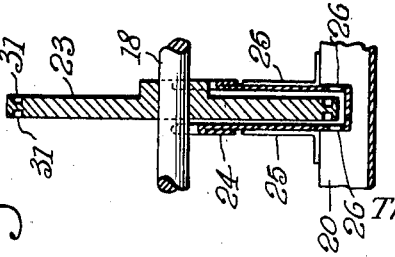
Inventor
Thomas W. Carraway
By
Baldwin & Wight
Attorneys

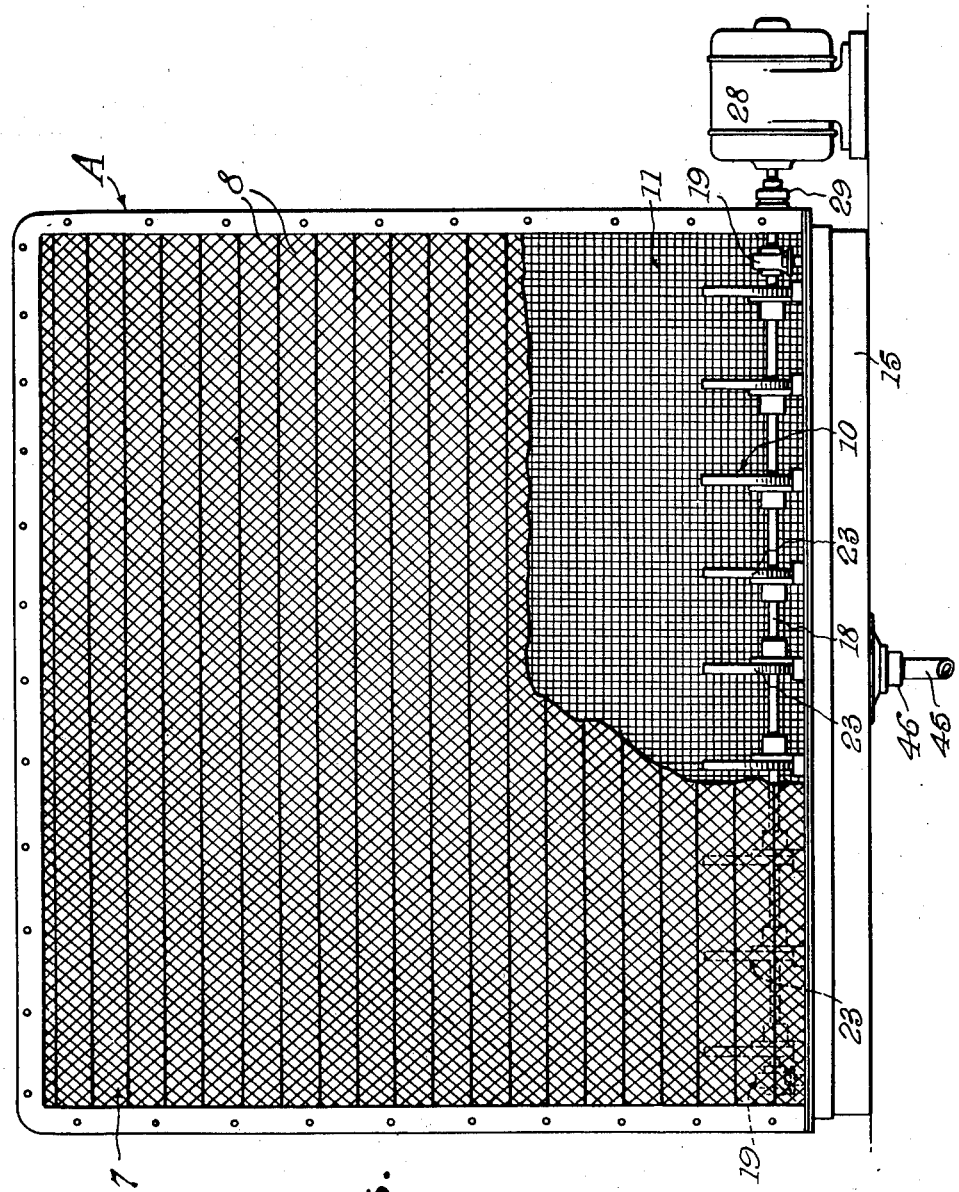

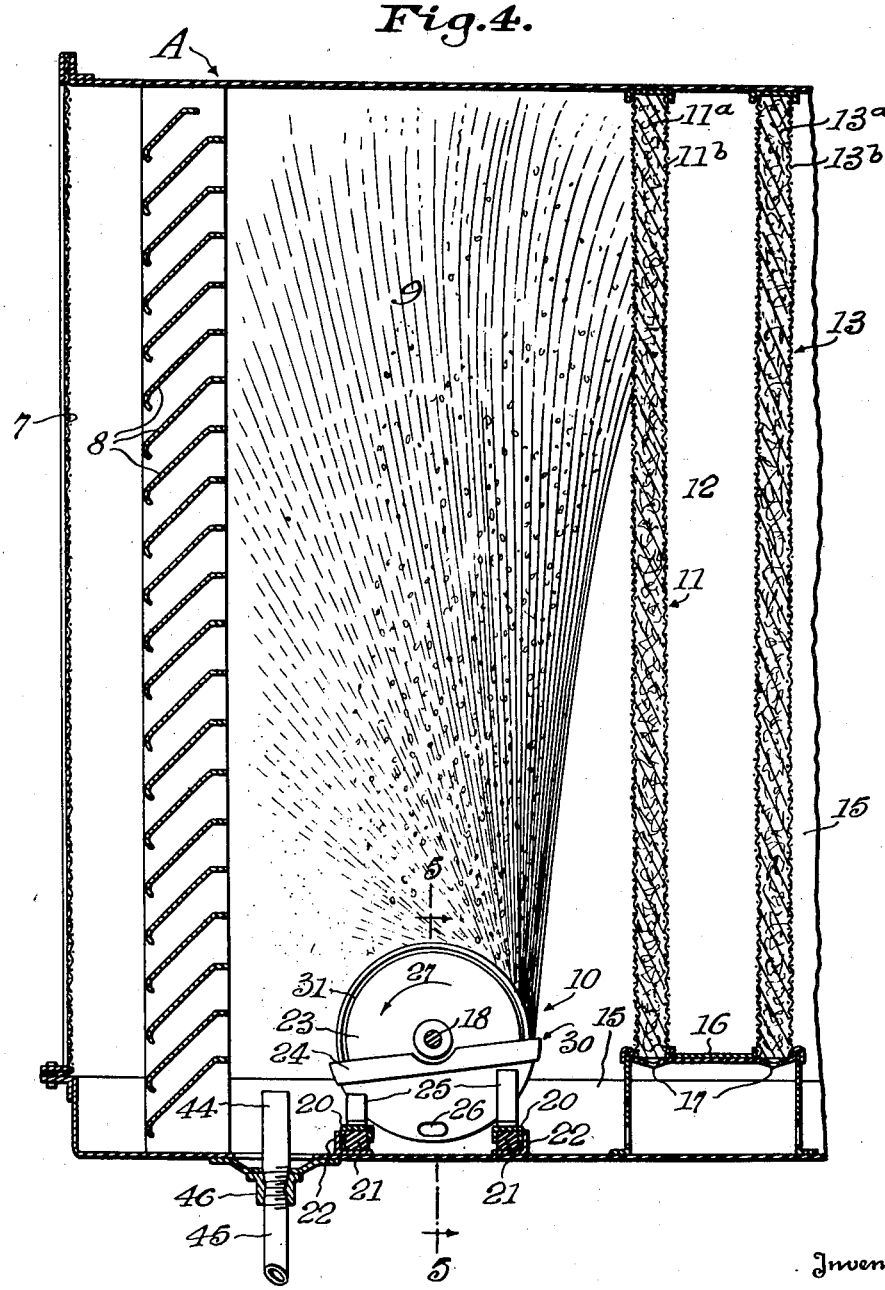

Patented Mar. 16, 1948

2,437,936

UNITED STATES PATENT OFFICE 2,437,936

AIR CONDITIONING APPARATUS

Thomas W. Carraway, Dallas, Tex.

Application November 30, 1944, Serial No. 565,839

7 Claims. (Cl. 261—92)

This invention relates to air conditioning apparatus and more particularly to apparatus for washing air to remove entrained foreign particles and dust and for cooling the air by evaporation of the cleaning or washing liquid.

Apparatus of this general class heretofore known has had numerous disadvantages. Effective cleaning of air by washing requires the use of great quantities of washing liquid, e. g., water, which, if not recirculated, is very expensive. In prior installations in which the washing water is recirculated it has not been possible to maintain the filters clean and consequently their efficiency has fallen rapidly, requiring frequent shut-downs for filter replacement.

An object of the present invention is to provide a new and improved apparatus of the class referred to in which the filter, e. g., a mat or pack of glass strands or the like, is constantly and copiously bathed in an economical way with cleaning liquid which, during the course of being recirculated, drains through the filter and carries off the solid particles.

Another object of the invention is to provide improved equipment for creating, in an air conditioning duct or chamber, a diffused volume or body of cleaning liquid varying from relatively coarse separated particles to finely atomized liquid constituting a mist or fog through which the air must pass before flowing through a filter.

A further object of the invention is to provide improved automatic controls for apparatus of the character stated. Other objects will become apparent from a reading of the following description, the appended claims, and the accompanying drawings, in which:

Figure 2 is a horizontal section on the line 2—2 of Figure 1;

Figure 3 is an end elevation showing the apparatus as viewed from the left of Figure 1 with parts of an entrance screen and louvers or vanes being broken away in order that interior parts may be seen, some external appurtenances also being omitted;

Figure 4 is a fragmentary longitudinal vertical section of the entrance end portion of the air conditioning apparatus drawn on an enlarged scale;

Figure 5 is a fragmentary vertical section on the line 5—5 of Figure 4 drawn on an enlarged scale;

Figure 1:
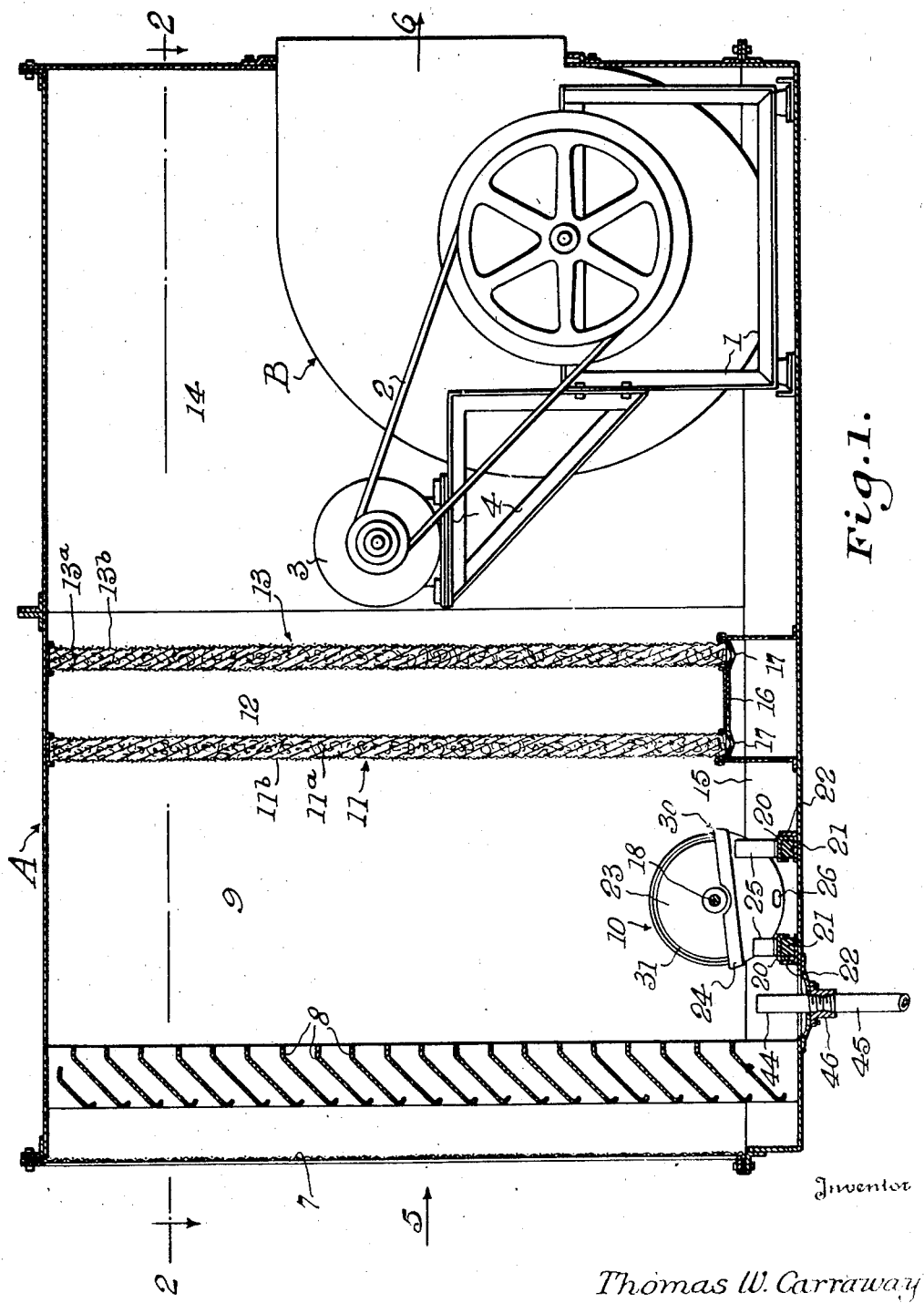
Figure 1 is a longitudinal vertical section of air conditioning apparatus embodying the invention, some parts being shown in elevation.

The illustrative embodiment of air washing or conditioning apparatus embodying the invention includes a casing or duct A and conventional equipment including a blower B for moving air through the casing for being conditioned. The blower B is mounted on a bracket or frame 1 and is driven through a belt 2 by an electric motor 3 supported on a bracket 4. The blower shown is of the well known squirrel cage centrifugal type and its structural details are not illustrated. When the blower is running air enters the duct A in the direction of the arrow 5 in Figure 1, passes through the duct A to the center of the blower, and is then discharged from the blower as indicated by the arrow 6. Thus, flow of air through the casing or duct A is from left to right as viewed in Figures 1, 2 and 4.

The air flowing through the duct A first passes through a wire mesh screen 7 which prevents entrained leaves, large insects or other sizable particles or objects from entering the duct. The air then impinges upon and passes between louvers or vanes 8, the purpose of which will be described later, and flows on to a washing and conditioning chamber 9 in the bottom of which is mounted liquid throwing and atomizing equipment generally designated 10. The right hand end of the conditioning and washing chamber 9 is bounded by a first filter or aeration pack 11 mounted in the duct to extend across or transversely to the flow of air. After leaving the first filter 11 the air stream passes through an open space 12 and then through a second filter or aeration pack 13, and finally to the chamber 14 in which the blower B is mounted.

In accordance with one feature of the invention the liquid throwing and atomizing equipment 10 is of novel construction, has new and advantageous operating advantages, and is so coordinated or related to the louvers 8 and the filter or aeration pack equipment as to provide for more effective conditioning of the air, particularly its washing or cleaning, than heretofore has been possible. One of the advantageous operating features resides in the production in the chamber 9 of a diffused volume of washing liquid which varies from relatively coarse particles in the region of the filter 11 to very finely divided or atomized particles constituting a mist or fog in the region of the vanes 8. The coarsely separated or diffused particles in the region of the filter 11 are thrown against the latter in a compact heavy stream directed mainly against the top portion of the filter so as forcibly to dislodge from the filter deposited particles of dust, dirt, or foreign matter which have been removed from the air stream. Preferably the filter 11 comprises a mat or pack of glass strands or fibers 11ᵃ supported by wire mesh screens 11ᵇ, although other material having substantially the properties of glass strands or fibers may be used. The second filter pack 13 may be of similar construction including a mat or pack of glass or the like strands or fibers 13ᵃ supported by screens 13ᵇ.

The cleaning liquid thrown upon the upper portion of the filter 11 trickles or runs down through the lower portions of the filter and picks up and carries with it foreign matter which has been deposited. The liquid and the foreign matter then drops into a tank 15 which forms the bottom of the casing A. Preferably the filters 11 and 13 are supported on a stand 16 formed with openings 17 permitting the drainage of the liquid from the filters.

The liquid throwing and atomizing equipment 10 is itself of such construction and is so related to the filter 11 and vanes 8 as to effect highly efficient cleaning and conditioning of the air at a cost much lower than has been possible with the use of high pressure pumps and high pressure atomizing nozzles as heretofore practiced. The improved liquid throwing and atomizing equipment shown for the purposes of illustration includes a horizontal shaft 18 in the bottom of the duct A extending across or transversely to the direction of flow of air. The shaft is journaled in bearings 19 supported at the ends of parallel channel irons 20 resting upon rubber vibration absorbing cushioning elements 21 which in turn are supported upon angle members 22 resting upon the bottom of the tank 15. Spaced or deployed along and fixed to the shaft 18 is a plurality of discs 23 which are disposed respectively in planes parallel to the direction of air flow in advance of the filter 11. Closely embracing the lower portion of each disc with operating clearance is a pan 24 supported by brackets 25 carried on the channel members 20. Each individual pan is formed with openings 26 in its lower portion below the normal level of evaporative cleaning liquid in the bottom tank 15.

In operation the shaft is rotated in the direction of the arrow 27 in Figure 4 by a motor 28 connected to the shaft by a flexible coupling 29, the arrangement being such that the lower portions of the discs 23 run through the supplies of liquid in the individual pans 24 and the peripheries of the discs leave or move out of the pans upwardly adjacent the filter 11. The cleaning liquid adhering to the discs is thus thrown upwardly in a relatively coarse stream or succession of separated particles directed against the top portion of the filter 11 by the edges 30 of the pans which act as deflectors, preventing a substantial amount of the cleaning liquid from being thrown directly against the lower portion of the filter 11. The liquid drains down through the filter in sufficient amount to maintain the lower part of the filter wet, and consequently direction of the stream upon the top portion of the filter gives the desirable result of substantial uniformity of wetness and washing effect throughout the whole filter.

The liquid drains down through the filter, over the face of the filter, and the in-rush of air caused by the blower covers the face and saturates aeration pack 11 with the small particles of fluid discharged from the discs which envelops the myriad fibers in the aeration pack and this increases the saturation efficiency and improves evaporation. The impact of the fluid particles on the face of aeration pack 11 has an additional advantage of thoroughly cleansing the filter of suspended matter that is washed from the face and fibers of aeration pack 11 into pan 15.

Most effective removal of foreign matter from the air and cooling of air passing through the duct A is obtained by subjecting the air to preliminary treatment by moisture before the air passes through the filter 11. In accordance with the invention the treating of the air in this manner is made possible by so constructing and arranging the equipment 10 that liquid picked up in the pans 24 is thrown off first in a relatively coarse series of streams or sheets of liquid particles in the region of the filter 11 and in progressively more finely separated or atomized condition throughout the chamber 9 from right to left as viewed in Figure 4, the condition of the moisture in the region of the louvers 8 being such as to constitute substantially a mist or fog.

I have found that this desirable result can be produced by forming the discs 23 in such manner that some of the liquid they pick up in the pans 24 is thrown off from the disc peripheries immediately upon emerging from the pans 24 while additional liquid picked up in the pans is retarded in being thrown off from the discs 23 so as to be thrown off in decreasing amounts as the disc peripheral portions move counterclockwise as viewed in Figure 4 from right to left above the pans 24. In the illustrative construction each disc 23 is formed with a concentric face groove 31 adjacent the disc periphery and preferably both faces of each disc are provided with such grooves. As the discs turn or pass through the baths of liquid in the pans 24 liquid adheres to the disc peripheries and is picked up in the grooves 31. As the disc peripheral portions move out of the associated pans 24 most of the liquid adhering directly to the disc peripheries is thrown off centrifugally in relatively coarsely separated condition adjacent the filter 11. The remainder of the liquid carried on the disc peripheries is thrown off in progressively decreasing amounts and in increasing degree of separation or atomization. Liquid contained in the grooves 31 has to work its way laterally to the faces of the discs before it can be thrown off. Thus, some of the groove-held liquid is not discharged from the discs until they have moved through substantially 180 degrees after leaving the liquid baths. Consequently, cleaning liquid is diffused throughout substantially the whole of the chamber 9 without the use of expensive high pressure pump and nozzle equipment which, as is well known, involves high power costs and frequent shut-downs for cleaning the nozzles to maintain them serviceable.

Some imperfectly atomized droplets of cleaning liquid will impinge on the vanes 8 which act as baffles to prevent liquid from being thrown out of the entrance end of the duct A. Droplets which may be deposited upon the vanes 8 are picked up by the entering air stream, and if not evaporated during passage through the chamber 9, are stopped by the filter 11 through which they will descend and return to the bottom tank 15. Although the filter 11 prevents the passage of substantially all entrained cleaning liquid droplets it is desirable to provide the supplemental or second filter 13 which intercepts and returns to the tank any stray drops which may have worked through the filter 11.

In the illustrative embodiment of the invention the liquid throwing and atomizing equipment 10 comprises nine units each including a disc 23 and pan 24 deployed along the shaft 18. It is apparent, however, that the number of such units required will vary according to the size of the duct and the expanse of the filter pack 11 to be washed.

Complete and efficient cleaning of air flowing through the duct A requires the continuous delivery of great quantities of water to the chamber 9 and upon the filter 11. By far the greater part of the water drains back to the bottom tank 15 and is then reused, the cycle being a continuous recirculation. Because of the large size of the tank 15 the cleaning liquid supply is spread out over a large area, which is conducive to precipitation of solid matter to the bottom of the tank. Efficient precipitation of the solid particles is also enhanced by enclosing the bottom portions of the discs 23 within the pans 24 which prevents the discs from maintaining the main body of cleaning liquid in a state of agitation, which would hold the solid particles in suspension. Thus solid particles, once having been removed from the air stream and filter 11, will not be picked up by the discs and thrown into the chamber 9 or against the filter 11. Only occasional or seasonal removal of solid matter collected on the bottom of the tank is required.

Figure 6:
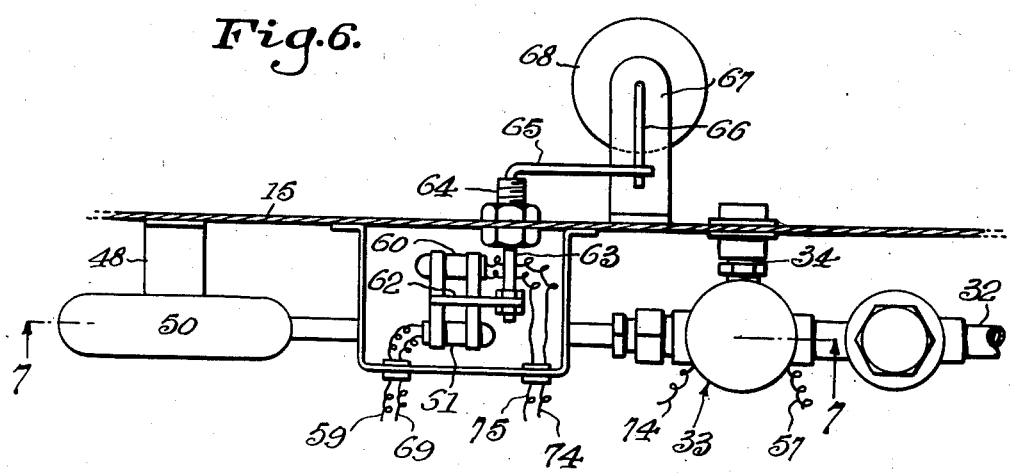
Figure 6 is an enlarged fragmentary plan view of equipment for adding make-up evaporative fluid to a main fluid tank.
Figure 7:
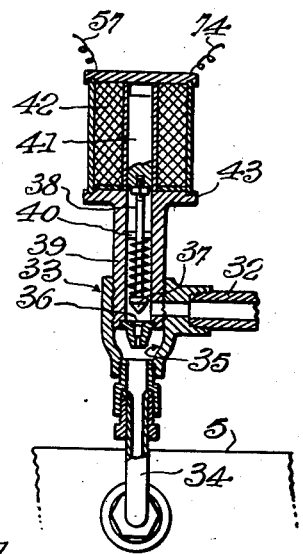
Figure 7 is a detail view partly in section on the line 7—7 of Figure 6, and partly in elevation showing a valve for controlling the adding of make-up evaporative fluid.

Although most of the cleaning liquid is kept in circulation, some of it is evaporated in cooling the air so that it is necessary to add make-up liquid in order to maintain the discs 23 bathed in liquid. As shown in Figures 2, 6 and 7, water or other cleaning liquid may be drawn through a supply pipe or conduit 32 which leads through an injector valve 33 to a pipe or conduit 35 through which liquid is delivered to the tank 15. Figure 7 shows the valve in its raised or open position but normally it is held on its seat by a spring 39 interposed between the valve head 37 and a fixed spring seat 40. The valve is adapted to be opened by an electrically operable device comprising a solenoid plunger 41 connected to the upper end of a stem 38 and operable in a solenoid coil 42 supported on a housing 43 which extends upwardly from the valve 33 and encloses the stem 38 and spring 39.

As shown in Figure 4, a safety drain for preventing overflowing of the tank 15 comprises a pair of pipes 44 and 45 screwed into a fitting 46 secured to the bottom of the tank 15. If the level of liquid in the tank 15 rises above the top of the pipe 44 liquid will flow off through the pipes 44 and 45 so as not to overflow the tank. The tank may be drained conveniently by merely unscrewing the pipe 44.

Apparatus embodying the invention preferably also includes an improved arrangement of electrical equipment for controlling the operation of the blower, the atomizing cleaning equipment 10, and the equipment for adding make-up cleaning liquid. Generally stated, a thermostat is responsive to the temperature of the air discharged by the apparatus for starting and stopping the blower B and the atomizing cleanser equipment 10, and a humidostat is responsive to the humidity of the air discharged by the apparatus for controlling only the equipment 10. The arrangement is such that when the thermostat calls for operation of the blower and the equipment 10 these will operate providing the humidostat also calls for operation of the equipment 10. If the thermostat calls for operation and the humidostat does not call for operation, then only the blower will respond to the call of the thermostat.

Figure 8:
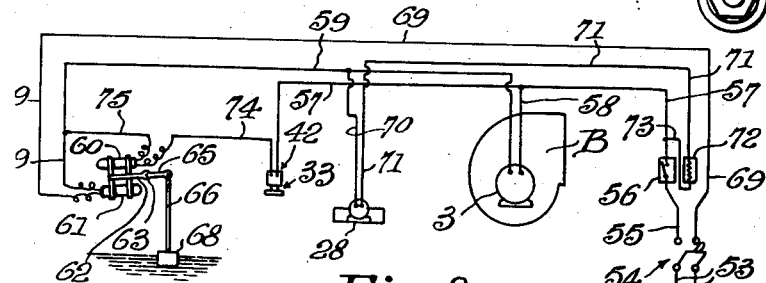
Figure 8 is a wiring diagram showing a control circuit.

A preferred arrangement of the electrical control equipment is shown diagrammatically in Figure 8 in which an electrical supply line is indicated at 53 as leading to a master cutout switch 54. One side of the switch 54 leads through a conductor 55 to a thermostat 56 which is positioned so as to respond to the temperature of air discharged by the apparatus. The thermostat 56 is connected to a conductor 57 which leads through another conductor 58 to one side of the blower motor 3. The other side of the motor 3 is connected to a conductor 59 which extends to electrical switching means including two mercury switch tubes 60 and 61 mounted on an arm 62 carried by a rock shaft 63 journaled in a sleeve 64 as shown in Figure 6. The shaft 63 is provided with a crank arm 65 connected to a stem 66 guided for vertical movement by a bracket 67 secured to the inside of the tank 15. The lower end of the stem 66 carries a float 68. When there is a sufficient quantity of water in the tank 15 to insure bathing of the lower portions of the discs 23, the mercury tube 61 will be in the tipped position shown in Figure 8 so that current can flow through the tube 61 to a conductor 69 which leads back to the other side of the master switch 54. Thus, when the thermostat responds to complete a circuit through the conductors 55 and 57, the motor 3 will be operated to drive the blower. If, however, the level of liquid in the tank 15 is lowered to the extent that the discs 23 will not be bathed, the float 68 will descend to tip the switch tube 61 and break the circuit between the conductors 59 and 69 which will prevent operation of the blower motor 3. Consequently the apparatus cannot operate to deliver air to the conditioned area when the atomizing cleaner is not conditioned to wash the air.

One side of the motor 28 which drives the discs 23 is connected to conductor 70 which in turn is connected to the conductor 59 in the circuit of the blower motor 3. The other side of the disc motor 28 is connected through a conductor 71, a humidostat 72, and a conductor 73 to the conductor 57. The humidostat 72 is located so as to be responsive to the humidity of air delivered by the conditioning apparatus.

It will be apparent that the humidostat control is effective only upon the atomizing cleanser motor 28 and not upon the blower motor 3. The tipping of the switch tube 61 in response to failure to maintain sufficient liquid in the tank 15 to bathe the discs 23 also breaks the circuit through the motor 28 so that the discs will not be rotated unless they are bathed in sufficient liquid to insure proper cleaning of the air.

The valve 33 controlling the addition of make-up cleaning liquid is opened only when the liquid in the tank 15 descends to a predetermined level somewhat higher than the level at which the entire apparatus is disabled. One side of the solenoid winding 42 is connected to the conductor 57 and the other side of the winding is connected through a conductor 74 to the mercury switch tube 60 which in turn is connected through a conductor 75 to the motor circuit conductor 59. If the liquid in the tank 15 descends to a predetermined low level, the float 68 will move downwardly to tip the switch tube 60 until contact is made between the conductors 74 and 75, thereby energizing the solenoid winding 42 and opening the valve 33. When the proper liquid level has been restored in the tank 15 the float 68 will rise to tip the switch tube 60 back to the position shown in Figure 8, thereby breaking the circuit, deenergizing the solenoid winding and permitting the valve 33 to close.

The cooperation of the component parts of the apparatus has been described above, but it will be helpful to consider by way of recapitulation the progressive action upon the air flowing through the apparatus. Upon entering the duct A the air is contacted by particles or drops of cleaning liquid adhering to the wetted surface of the vanes 8 and the interior walls of the duct. Partial removal of suspended solid particles from the air and partial evaporation of moisture lowering the temperature of the air is thereby effected. The air stream then encounters the mist or fog in the region of the vanes 8 and passes through the chamber 9 and contacts the cleaning liquid particles which progressively increase in size and coarseness of dispersion as the filter 11 is approached. Some of the solid particles entrained in the air are caught by liquid particles which drop back into the tank 15. Finally the air passes through the thoroughly wetted aeration pack or filter 11 which removes substantially all of the residual solid particles and the cleaned air then passes on through the second filter pack 13 to the blower chamber 14.

Cooling of the air is accomplished by adiabatic saturation of liquid on the vanes 8 and on the walls of the chamber 9, and the liquid which is diffused or dispersed within the chamber 9. The final lowering of the temperature, however, is accomplished by evaporation of the multitudinous films of liquid deposited on the myriad strands 11a of glass or the like in the filter 11. Any free moisture which may slip past the filter 11 will be trapped by the filter 13 from which it is returned to the tank 15. Thus, only dust-free, clean, cool air without free moisture or clamminess is delivered to the conditioned area.

The apparatus disclosed by way of example embodies the invention in a preferred form, but it will be apparent that changes may be made in the construction of individual parts and their relative arrangement without departing from the invention as defined in the claims.

I claim:

1. In air conditioning apparatus, a duct; equipment for moving air through said duct; and means for creating in said duct a diffused volume of liquid, said means comprising a disc having a concentric groove in at least one of its faces, means providing a supply of liquid, means mounting said disc to rotate with a portion thereof including said groove running through said liquid, and means for rotating said disc, said groove having an outer annular wall substantially constituting a cylindrical surface whereby liquid picked up in said groove from said supply will gradually and progressively work its way laterally to the grooved face of the disc thus retarding the discharging of part of the groove-held liquid from the disc and causing the character of the diffused liquid to vary progressively from a forceful spray of relatively coarse separated particles in one part of said duct to finely atomized liquid constituting a fog or mist in another part of said duct.

2. In air conditioning apparatus, a duct; equipment for moving air through said duct: and means for creating in said duct a diffused volume of liquid, said means comprising a horizontal shaft; a plurality of spaced discs fixed to said shaft, at least one face of each of said discs being formed with a concentric groove, means for holding a supply of liquid in such position that the lower portions of said discs and their grooves dip into the liquid, and means for rotating said shaft and discs, said grooves respectively having outer annular walls substantially constituting cylindrical surfaces whereby liquid picked up in said grooves from said supply will gradually and progressively work its way laterally to the faces of the discs thus retarding the discharging of the groove-held liquid from the discs and causing the character of the diffused liquid to vary progressively from a forceful spray of relatively coarse separated particles in one part of said duct to finely divided atomized liquid constituting a fog or mist in another part of said duct.

3. In air conditioning apparatus, a duct; equipment for moving air through said duct; and means for creating in said duct a diffused volume of liquid, said means comprising a disc having a concentric groove in at least one of its faces, means mounting said disc to rotate about a substantially horizontal axis, a pan closely embracing the lower portion of the disc with operating clearance between the pan and disc, means for supplying liquid to said pan at a rate at least equal to the rate at which liquid is discharged from said pan by said disc so as to maintain a constant liquid level in the pan substantially above the bottom of the disc, and means for rotating said disc, said groove having an outer annular wall substantially constituting a cylindrical surface whereby liquid picked up in said groove from said supply will gradually and progressively work its way laterally to the grooved face of the disc thus retarding the discharging of part of the groove-held liquid from the disc and causing the character of the diffused liquid to vary progressively from a forceful spray of relatively coarse separated particles in one part of said duct to finely atomized liquid constituting a fog or mist in another part of said duct.

4. In air conditioning apparatus, a duct; equipment for moving air through said duct; and means for creating in said duct a diffused volume of liquid varying from relatively coarse separated liquid particles to finely atomized liquid constituting a fog or mist, said means comprising a disc having a concentric groove in at least one of its faces, means providing a supply of liquid, means mounting said disc to rotate with a portion thereof including said groove running through said liquid, a deflector extending across and adjacent the periphery of said disc and terminating just beyond the point at which the disc passes out of said liquid, and means for rotating said disc.

5. In air conditioning apparatus, a duct; equipment for moving air substantially horizontally through said duct; a filter pack having substantially the properties of matted glass strands disposed substantially vertically in said duct and across the flow of air through the duct; and means for maintaining said filter pack substantially uniformly wet from top to bottom and for creating within said duct in advance of said filter pack a diffused volume of liquid varying from a stream of relatively coarse separated liquid particles directed to impinge upon the top portion of said filter pack to finely atomized liquid constituting a fog or mist in said duct in advance of said filter pack, said means comprising a horizontal shaft extending transversely to the flow of air through said duct and in advance of the filter pack, a plurality of substantially vertical discs fixed to and deployed along said shaft, each of said discs having a concentric groove in at least one of its faces, means for applying liquid to the discs, means for rotating said shaft, and deflector means between said filter pack and said discs and close to said discs for confining said stream of relatively coarse separated liquid particles to impinge on the upper portion of said filter pack, whereby the large amount of liquid thrown on the upper portion of said filter pack will trickle down through said pack to maintain it substantially uniformly wet.

6. In air conditioning apparatus, a duct; a blower for moving air through said duct; an electric motor for driving said blower; means for creating in said duct a diffused volume of liquid varying from relatively coarse separated liquid particles to finely atomized liquid constituting a fog or mist, said means comprising a plurality of discs deployed across the flow of air through said duct and disposed substantially in vertical planes parallel to the direction of air flow, means for bathing the bottom portions of said discs with evaporative fluid, and an electric motor for rotating said discs; a thermostat responsive to temperature of air discharged by said apparatus; a humidostat responsive to humidity of the discharged air; means connecting said thermostat and said humidostat in controlling relation to said motors to effect operation of said blower under control of said thermostat and operation of said discs under control of both said thermostat and said humidostat; and means responsive to failure of said disc bathing means to maintain the discs properly bathed in liquid for superseding the control effected by said thermostat and said humidostat and preventing operation of both said motors.

7. In air conditioning apparatus, a duct; a blower for moving air through said duct; an electric motor for driving said blower; means for creating in said duct a diffused volume of liquid varying from relatively coarse separated liquid particles to finely atomized liquid constituting a fog or mist, said means comprising a plurality of discs deployed across the flow of air through said duct and disposed substantially in vertical planes parallel to the direction of air flow, means including a tank underneath said discs for bathing the bottom portions of said discs with evaporative fluid, an electrically operable device for introducing make-up evaporative fluid to said tank, and an electric motor for rotating said discs; a thermostat responsive to temperature of air discharged by said apparatus; a humidostat responsive to humidity of the discharged air; means connecting said thermostat and said humidostat in controlling relation to said motors to effect operation of said blower under control of said thermostat and operation of said discs under control of both said thermostat and said humidostat; and electric switch means responsive to lowering of the liquid to a first predetermined level in said tank for effecting operation of said device for adding make-up evaporative liquid to said tank and responsive to lowering of the liquid to a second predetermined level in said tank for superseding the control effected by said thermostat and said humidostat and preventing operation of both said motors.

THOMAS W. CARRAWAY.

REFERENCES CITED

The following references are of record in the file of this patent:

UNITED STATES PATENTS

| Number | Name | Date |
|---|---|---|
| 250,775 | Beal | Dec. 13, 1881 |
| 254,003 | Gontard | Feb. 21, 1882 |
| 998,975 | Mies | July 25, 1911 |
| 1,296,315 | Philips | Mar. 4, 1919 |
| 1,528,204 | Greenawalt | Mar. 3, 1925 |
| 1,609,758 | MacMahon | Dec. 7, 1926 |
| 1,776,461 | Waterman, Jr. | Sept. 23, 1930 |
| 1,848,202 | Scott | Mar. 8, 1932 |
| 1,925,907 | Norris | Sept. 5, 1933 |
| 1,948,278 | Payne et al. | Feb. 20, 1934 |
| 2,035,628 | Whitman et al. | Mar. 31, 1936 |
| 2,055,958 | Amos | Sept. 29, 1936 |
| 2,060,732 | Hopkins et al. | Nov. 10, 1936 |
| 2,073,204 | Friedrick | Mar. 9, 1937 |
| 2,187,019 | De Mund et al. | Jan. 16, 1940 |
| 2,215,753 | Goodman et al. | Sept. 24, 1940 |
| 2,385,483 | Mode | Dec. 19, 1944 |

FOREIGN PATENTS

| Number | Country | Date |
|---|---|---|
| 2,927 | Great Britain | Mar. 1, 1886 |